(12) United States Patent
Knight et al.

(10) Patent No.: US 12,019,954 B1
(45) Date of Patent: *Jun. 25, 2024

(54) CONVERSATIONAL VIRTUAL ASSISTANT

(71) Applicant: United Services Automobile Association (USAA), San Antonio, TX (US)

(72) Inventors: Brett Knight, San Antonio, TX (US); Jeffrey William Gallagher, San Antonio, TX (US); Justin Leggett, Bulverde, TX (US); Andrew P. Jamison, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,197

(22) Filed: Jun. 9, 2023

Related U.S. Application Data

(63) Continuation of application No. 17/829,347, filed on May 31, 2022, now Pat. No. 11,714,601, which is a continuation of application No. 17/008,364, filed on Aug. 31, 2020, now Pat. No. 11,379,182, which is a
(Continued)

(51) Int. Cl.
| | |
|---|---|
| *G06F 3/16* | (2006.01) |
| *G06F 3/0482* | (2013.01) |
| *G06F 3/0487* | (2013.01) |
| *G06Q 10/02* | (2012.01) |
| *G06Q 30/016* | (2023.01) |
| *G10L 15/18* | (2013.01) |
| *G10L 15/183* | (2013.01) |

(Continued)

(52) U.S. Cl.
CPC ............ *G06F 3/167* (2013.01); *G06F 3/0482* (2013.01); *G06F 3/0487* (2013.01); *G06Q 10/02* (2013.01); *G06Q 30/016* (2013.01); *G10L 15/1815* (2013.01); *G10L 15/183* (2013.01); *G10L 15/22* (2013.01); *H04M 3/50* (2013.01)

(58) Field of Classification Search
CPC ...... G06F 3/167; G06F 3/0482; G06F 3/0487; G06Q 10/02; G06Q 30/016; G10L 15/1815; G10L 15/183; G10L 15/22; H04M 3/50
See application file for complete search history.

(56) References Cited

U.S. PATENT DOCUMENTS

| | | |
|---|---|---|
| 10,795,640 B1 | 10/2020 | Knight et al. |
| 2014/0245140 A1 | 8/2014 | Brown et al. |

(Continued)

FOREIGN PATENT DOCUMENTS

KR 20120114431 A 10/2012

*Primary Examiner* — Quoc A Tran
(74) *Attorney, Agent, or Firm* — Potomac Law Group, PLLC; Dannon G. Allbee (57) ABSTRACT

Methods and systems described in this disclosure receive a request for assistance from a device associated with a user, launch a conversational virtual assistant on the device, determine at least one potential subject of the request based on information associated with the user and a tab or webpage from which the conversational virtual assistant is launched, receive a verification of the subject of the request, create a contact menu with options for receiving the assistance, and receive a selection of one of the options.

20 Claims, 11 Drawing Sheets

Related U.S. Application Data continuation of application No. 15/698,494, filed on Sep. 7, 2017, now Pat. No. 10,795,640.

(60) Provisional application No. 62/385,384, filed on Sep. 9, 2016.

(51) Int. Cl.
*G10L 15/22* (2006.01)
*H04M 3/50* (2006.01)

(56) References Cited

U.S. PATENT DOCUMENTS

| | | | |
|---|---|---|---|
| 2015/0256677 A1* | 9/2015 | Konig | H04M 3/5191 |
| | | | 379/265.09 |
| 2016/0099892 A1* | 4/2016 | Palakovich | H04L 51/04 |
| | | | 709/206 |
| 2017/0346949 A1 | 11/2017 | Sanghavi et al. | |
| 2017/0359421 A1* | 12/2017 | Stoops | H04L 67/141 |

* cited by examiner

CONVERSATIONAL VIRTUAL ASSISTANT

CROSS-REFERENCE TO RELATED APPLICATIONS

This application is a continuation of U.S. application Ser. No. 17/829,347, filed May 31, 2022, entitled "CONVERSATIONAL VIRTUAL ASSISTANT," currently pending, which is a continuation of U.S. application Ser. No. 17/008,364, filed Aug. 31, 2020, entitled "CONVERSATIONAL VIRTUAL ASSISTANT," now U.S. Pat. No. 11,379,182 issued on Jul. 5, 2022, which is a continuation of U.S. application Ser. No. 15/698,494, filed Sep. 7, 2017, entitled "CONVERSATIONAL VIRTUAL ASSISTANT," now U.S. Pat. No. 10,795,640 issued on Oct. 6, 2020, which is a non-provisional of and claims priority to U.S. Provisional Application No. 62/385,384, filed Sep. 9, 2016, entitled "CONVERSATIONAL VIRTUAL ASSISTANT," all of which are hereby incorporated by reference in their entireties for all purposes.

TECHNICAL FIELD

Various embodiments of the present disclosure generally relate to assisting users. More specifically, various embodiments of the present disclosure relate to a conversational virtual assistant.

BACKGROUND

Many companies depend on interactive voice response (IVR) systems, representatives, websites, or mobile applications to provide service to their customers or potential customers. Each have their strengths and weaknesses—there may be a wait time for a representative and it may not be the correct representative, an IVR may not have the right selection for the customer, and the website or the mobile application may not have all the detailed information needed for the customer's particular situation.

BRIEF DESCRIPTION OF THE DRAWINGS

Embodiments of the present disclosure will be described and explained using the accompanying drawings, in which.

DETAILED DESCRIPTION

Mobile applications, websites, and other resources have made it easy for users to "self-service," that is, users can look at a website or application to find the answer to a question or to take an action, as opposed to calling an organization for information or to request an action. In many cases, users would rather self-service than call. However, users can become frustrated if, while navigating a website or an application, they are not able to locate the functionality or information they desire. If users then decide to call the organization, they may be frustrated before the call even begins. When callers are frustrated before calling an organization, or become frustrated with an interactive voice response ("IVR") system, callers tend to state the word "representative" in hopes of being taken out of the IVR flow and being connected to a human who can help them more immediately. This situation creates a dilemma for companies. On the one hand, companies do not want frustrated callers to be forced to listen to an IVR; on the other hand, companies do not like the inefficiency of directing users to a representative who is not knowledgeable in the area for which the user is calling. From the company's perspective, it is much more efficient to have users find the answer via the website or application or to determine what the caller is calling about and direct the caller to the appropriate representative directly (i.e., without needing to transfer the call).

Embodiments described herein provide a conversational virtual assistant that assists users by providing, in a conversational manner via a device, the help or answers that users are looking for on the website or an application, as well as by performing actions that users request (e.g., canceling a credit card, replacing a credit card, performing a transfer). Moreover, the conversational virtual assistant uses personal information about the user, along with contact center information, to provide a personalized, real-time contact menu with options for the user.

This disclosure describes authentication systems and methods designed to increase the efficiency of communications between a user and an organization. Various embodiments may provide one or more of the following technological improvements: (1) improved accuracy in identifying user questions or navigational issues; (2) increased efficiency in directing a caller, resulting in a shorter call time; (3) real-time or near real-time assistance including actions via a conversational virtual assistant; and (4) an efficient manner of determining contact options with real-time personalized information and creation of a contact option menu that is adaptable to multiple channels, including mobile applications and websites.

In the following description, numerous specific details are set forth to provide a thorough understanding of embodiments of the present disclosure. However, it will be apparent to one skilled in the art upon reading the disclosure that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, read-only memories (ROMs), random-access memories (RAMs), erasable programmable read-only memories (EPROMs), electrically erasable programmable read-only memories (EEPROMs), magnetic or optical cards, flash memory, or other types of machine-readable media suitable for storing electronic instructions.

Figure 1:
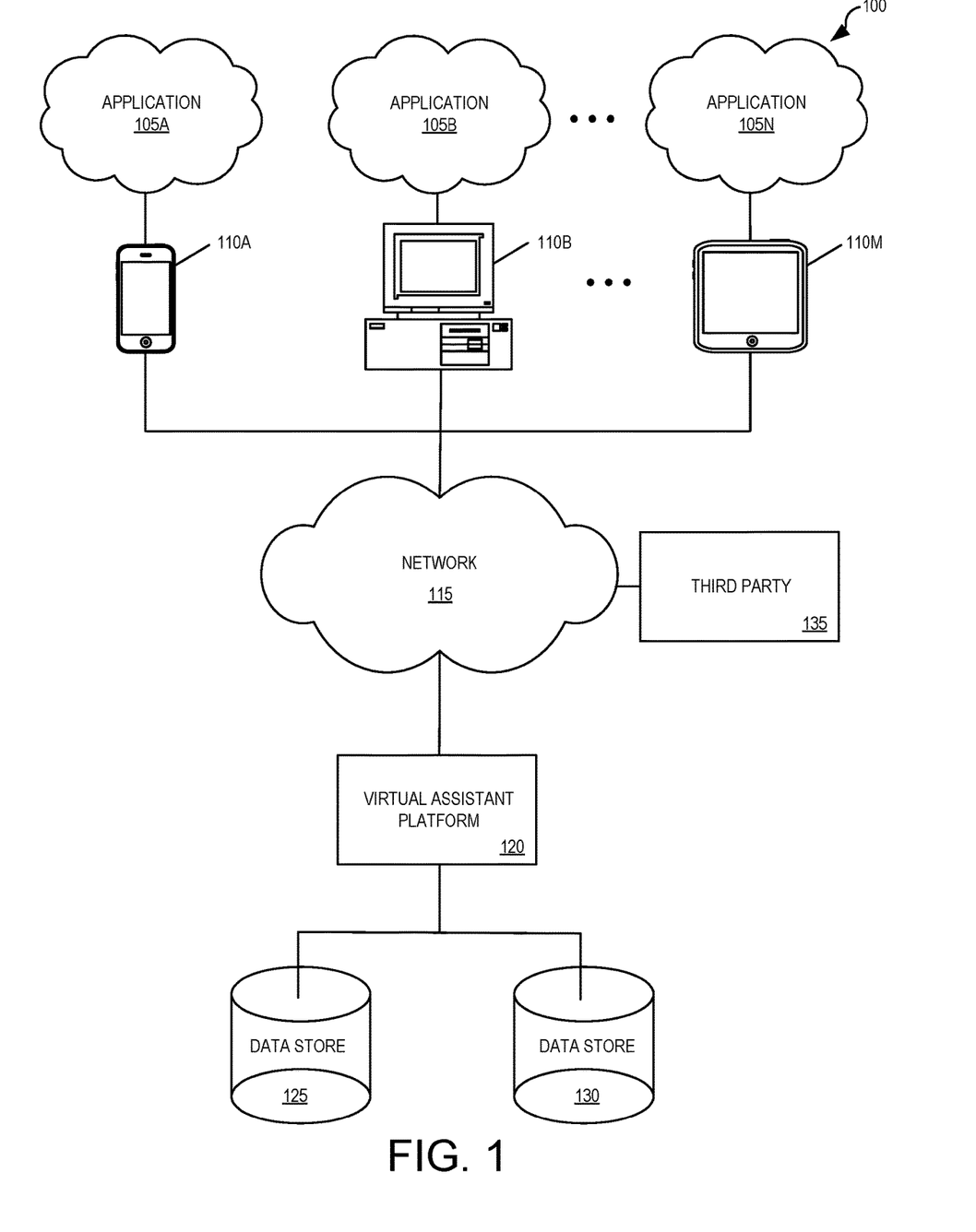
FIG. 1 illustrates an example of a network-based operating environment in accordance with various embodiments of the present disclosure.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to third party 135, virtual assistant platform 120, and data stores 125 and 130.

Computing devices 110A-110M may be configured to communicate via network 115 with virtual assistant platform 120. In some embodiments, computing devices 110A-110M can retrieve or submit information to virtual assistant platform 120 and run one or more applications with customized content retrieved by virtual assistant platform 120 and data stores 125 and 130. For example, computing devices 110A-110M can execute a browser application or a customized client to enable interaction between the computing devices 110A-110M, virtual assistant platform 120, and data stores 125 and 130.

Network 115 can be any combination of local area and/or wide area networks using wired and/or wireless communication systems. Network 115 can be or could use any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), user datagram protocol (UDP), hypertext transport protocol (HTTP), simple mail transfer protocol (SMTP), and file transfer protocol (FTP). Data exchanged over network 115 may be represented using technologies, languages, and/or formats including hypertext markup language (HTML), or extensible markup language (XML). In addition, all or some links can be encrypted using conventional encryption technologies such as secure sockets layer (SSL), transport layer security (TLS), and Internet Protocol Security (IPSec).

Virtual assistant platform 120 can run on one or more servers and can be used to receive navigational or help questions, gather information and determine contact options based on the information, perform actions for the user (e.g., fill out forms), store previous conversations, communicate with third parties (e.g., for natural language processing or other services), store profiles and/or policies in data stores 125 and 130, and/or perform other activities. In some embodiments, virtual assistant platform 120 includes various data processing and analytic tools that allow it to determine answers and take actions for the user. In some embodiments, virtual assistant platform 120 is a server.

Virtual assistant platform 120 may be communicably coupled with third party 135, data stores 125 and 130, and computing devices 110A-110M, and may communicate, access, or receive data (e.g., device information, authentication information) from third party 135, computing devices 110A-110M, and data stores 125 and 130. Virtual assistant platform 120 may be associated with a membership organization (e.g., a financial institution or an insurance company), and the callers may be members of the membership organization.

Virtual assistant platform 120 may be customized or calibrated by individual companies or service providers based on user needs and/or business objectives. For example, companies may have different business rules and/or contact options for providing assistance to a user.

Data stores 125 and 130 can be used to manage storage and access to user data such as user profiles, website or mobile application search history, account information, registered devices, user preferences, virtual assistant conversation logs, location information, security questions and answers, and other information. Data stores 125 and 130 may be data repositories of a set of integrated objects that are modeled using classes defined in database schemas. Data stores 125 and 130 may further include flat files that can store data. Virtual assistant platform 120 and/or other servers may collect and/or access data from data stores 125 and 130.

Third party 135 may be any type of service to assist with natural language processing, applying rules, determining wait times, and/or providing other functions related to virtual assistance. In some embodiments, third party 135 can receive a command or question from the user or from virtual assistant platform 120, determine what the user said, process the command or request, and report the command or request to virtual assistant platform 120.

Figure 2:
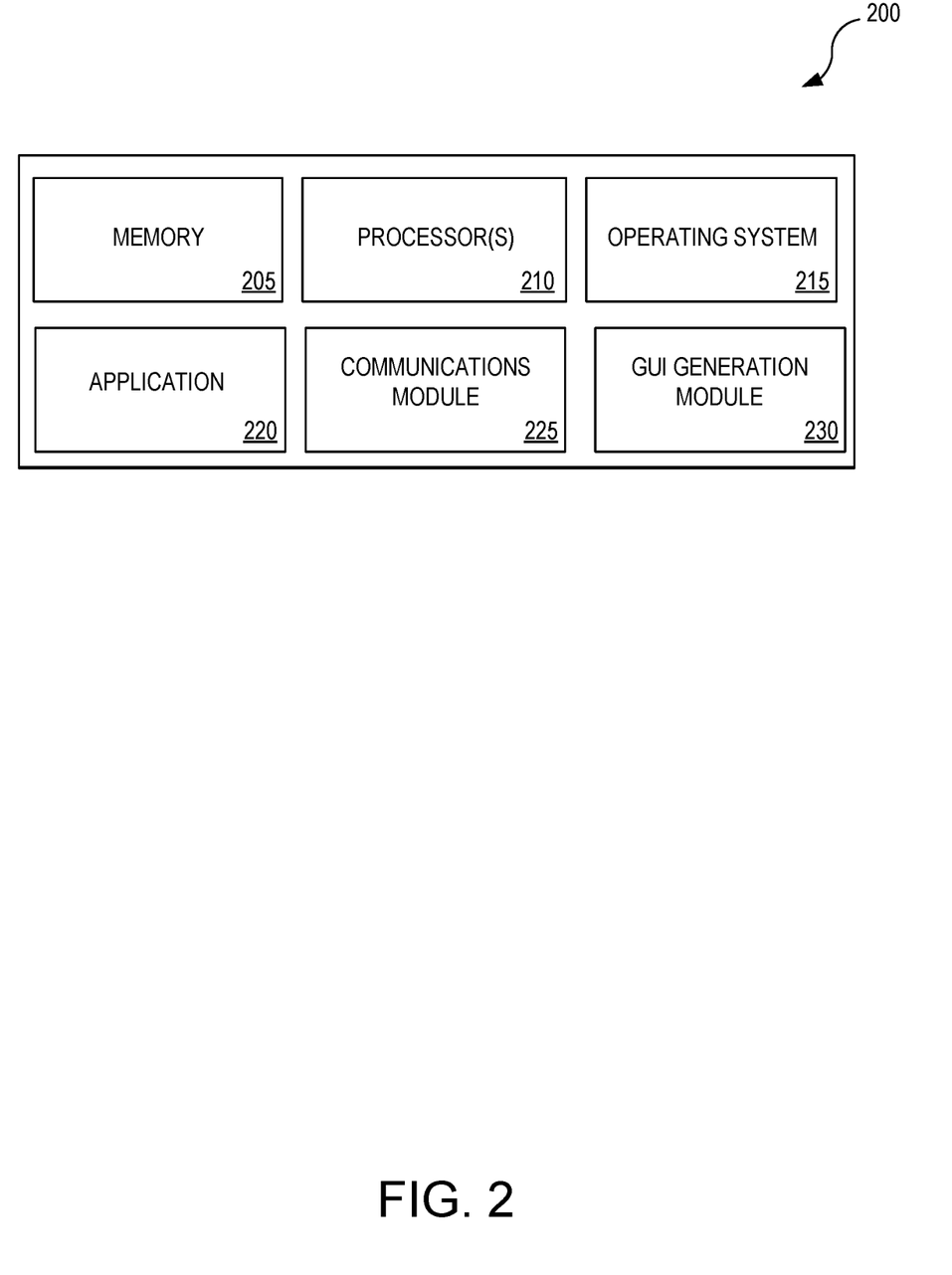
FIG. 2 illustrates various components of a computing device that may be used in accordance with one or more embodiments of the present disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, communications module 225, and graphical user interface (GUI) generation module 230. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module. For example, in one embodiment, application 220 and communications module 225 can be combined into a single component.

Memory 205 can be any device, mechanism, or populated data structure used for storing information. In accordance with some embodiments of the present disclosure, memory 205 can encompass, but is not limited to, any type of volatile memory, nonvolatile memory, or dynamic memory. For example, memory 205 can be random-access memory (RAM), memory storage devices, optical memory devices, magnetic media, floppy disks, magnetic tapes, hard drives, single inline memory modules (SIMMs), synchronous dynamic random-access memory (SDRAM), dual inline memory modules (DIMMs), Rambus dynamic random-access memory (RDRAM), double data rate random-access memory (DDR RAM), small outline dual inline memory modules (SODIMMs), EPROM, EEPROM, compact discs, DVDs, and/or the like. In accordance with some embodiments, memory 205 may include one or more disk drives or flash drives; one or more databases; one or more tables; or one or more files, local cache memories, processor cache memories, relational databases, flat databases; and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, communications module 225, and GUI generation module 230.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with virtual assistant platform 120. For example, application 220 can include an application for a financial service application, a money transfer application, a social networking application, and a gaming application.

Application 220 can access a server and/or a platform associated with an organization (e.g., virtual assistant platform 120) to display account data, receive transaction requests, display authentication requests and confirmations, and collect account information. For example, application 220 may be used to display an auto insurance card, report a lost payment instrument, request a new payment instrument, report that the user will be traveling, request account information, and/or deposit a check. In some embodiments, the requests are received and analyzed on computing device 110, and in other embodiments, the request is received on computing device 110 and sent to a server of an organization by communications module 225 for analysis. Should the user have a question, a "help" or "contact us" (or similar) button can be selected, which launches a virtual assistant to help the user navigate application 220 or to provide the user with additional contact options and wait times.

Communications module 225 can communicate with a third party (e.g., third party 135) and/or a server (e.g., virtual assistant platform 120). For example, communications module 225 can receive requests from application 220 and communicate the requests to the appropriate party, as well as receive responses to the requests. In some embodiments, communications module 225 can initiate an in-application call from the virtual assistant if the user selects a call option from a contact menu.

GUI generation module 230 can generate one or more GUI screens that allow for interaction with a user. In at least one embodiment, GUI generation module 230 generates a graphical user interface receiving and/or conveying information to the user. For example, the GUI generation module 230 may display a conversational virtual assistant when assistance is needed, and the conversational virtual assistant can display account status, automobile insurance cards, and other information for the user. GUI generation module 230 may further display archived conversations with the virtual assistant.

Figure 3:
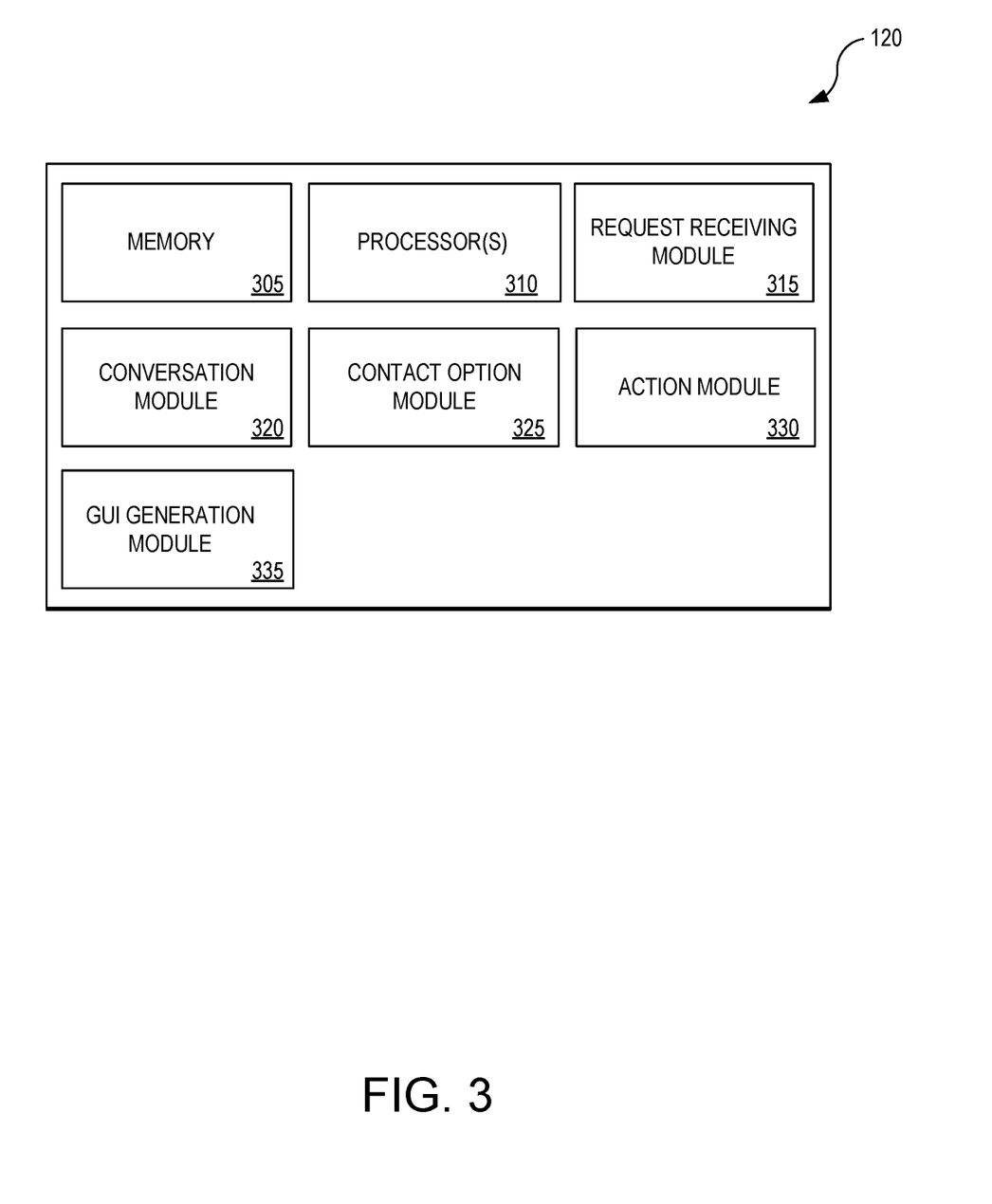
FIG. 3 illustrates various components of a virtual assistant platform that may be used in accordance with various embodiments of the present disclosure.

FIG. 3 illustrates a set of components within virtual assistant platform 120 according to one or more embodiments of the present disclosure. According to the embodiments shown in FIG. 3, virtual assistant platform 120 can include memory 305, one or more processors 310, request receiving module 315, conversation module 320, contact option module 325, action module 330, and GUI generation module 335. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of request receiving module 315, conversation module 320, contact option module 325, action module 330, and GUI generation module 335.

Request receiving module 315 receives a request for assistance. The request may be received via a "help" or "contact us" icon on a mobile application or website. Upon receiving a request for assistance, request receiving module 315 can cause a virtual assistant to pop up on the user's device. The system can communicate with the user via conversation module 320.

Conversation module 320 can allow the user to converse with the virtual assistant to obtain assistance. Conversation module 320 can simply ask the user the subject matter of the inquisition or can determine the likely subject of the request using a technique or a combination of techniques. For example, conversation module 320 can gather information regarding the user's accounts, products, or services, determine the user's last visited tab on the mobile application or website (or look within a previous time frame (e.g., 24 hours)), and/or check for recent product activity (e.g., claims, transfers, bills) and deduce one or more topics that may be the subject of the request. In a specific example, if the user has a credit card bill coming due within a period of time and if the user has recently been searching for insurance quotes on certain vehicles, conversation module 320 can provide a selection of topics that includes "Credit Card Bill," "Insurance Quotes," and "Other." If conversation module 320 provides a selection of topics, the user can select a topic by tapping one of the options, or by typing, speaking, or otherwise communicating the selection. In some embodiments, conversation module 320 provides the subject information to contact option module 325.

In some embodiments, conversation module 320 can request additional information. For example, if the user asks to see an account balance and conversation module 320 detects that there is more than one account associated with the user, then conversation module 320 can list out the different accounts and ask the user to select one of these accounts.

In some embodiments, the user can make selections presented by the virtual assistant and later change the selection by pressing a "Tap to Undo" button (e.g., FIG. 5). Thus, if the user wants to see the answer for a different response or subject, the user can easily go back in history and find the answer. In some embodiments, the user can speak or type into the user's device to communicate with the virtual assistant.

Contact option module 325 determines contact options for the user once conversation module 320 has determined a subject matter of the request. The options can be displayed in a menu, as shown, for example, in FIG. 9. The contact menu can include options to call a representative, chat with a representative, video conference with a representative, continue using the virtual assistant, set up an appointment with a representative, or other options. Because contact option module 325 is aware of the subject of the request from conversation module 320, contact option module 325 can determine and provide wait times for the user to speak with a representative who will be able to assist the user. For example, if the user has an automobile insurance question, then the wait time will reflect the wait time it will take for the user to speak with a representative who has experience with automobile insurance and can help the user with the automobile insurance question. In some embodiments, when the user clicks on the "call a representative" button, the call is directed via an application (e.g., mobile application) directly to the correct representative.

In some embodiments, contact option module 325 can determine which option is most recommended for the user. For example, if it is after hours, the contact menu may determine and state that the call center is closed and provide the hours the user can call, and further determine and state that the quickest option is to let the virtual assistant assist the user. Thus, virtual assistant platform 120 can use both contact center information and personalized user information to determine best options and estimated wait times for the user.

Action module 330 can receive an action from the user via conversation module 320. An example of a command may be "transfer $200 from Account 1 to Account 2." If the action or command is spoken, the speech is processed into text. Then, action module 330 processes the action by piecing each portion of the speech into an action and having the user verify the action. Thus, the user does not have to go to the user's account to take an action—the action can be taken via the conversational virtual assistant, and necessary forms can be filled out to effectuate the action (e.g., FIG. 10) with no further action from the user or a human representative. Examples of other actions the conversational assistant can help with include replacing or canceling a stolen or lost payment instrument, activating a new payment instrument, transferring funds, paying a bill, ordering checks, increasing a withdrawal limit, viewing an insurance policy, finding a banking location, or sending roadside assistance.

GUI generation module 335 is capable of generating one or more GUI screens that allow interaction with a user. In at least one embodiment, GUI generation module 335 generates a graphical user interface receiving information from and/or conveying information to the user. For example, GUI generation module 335 can display the user's conversation with the virtual assistant so that a representative can understand what the user has already been asked and to better understand the user's question.

Figure 4:
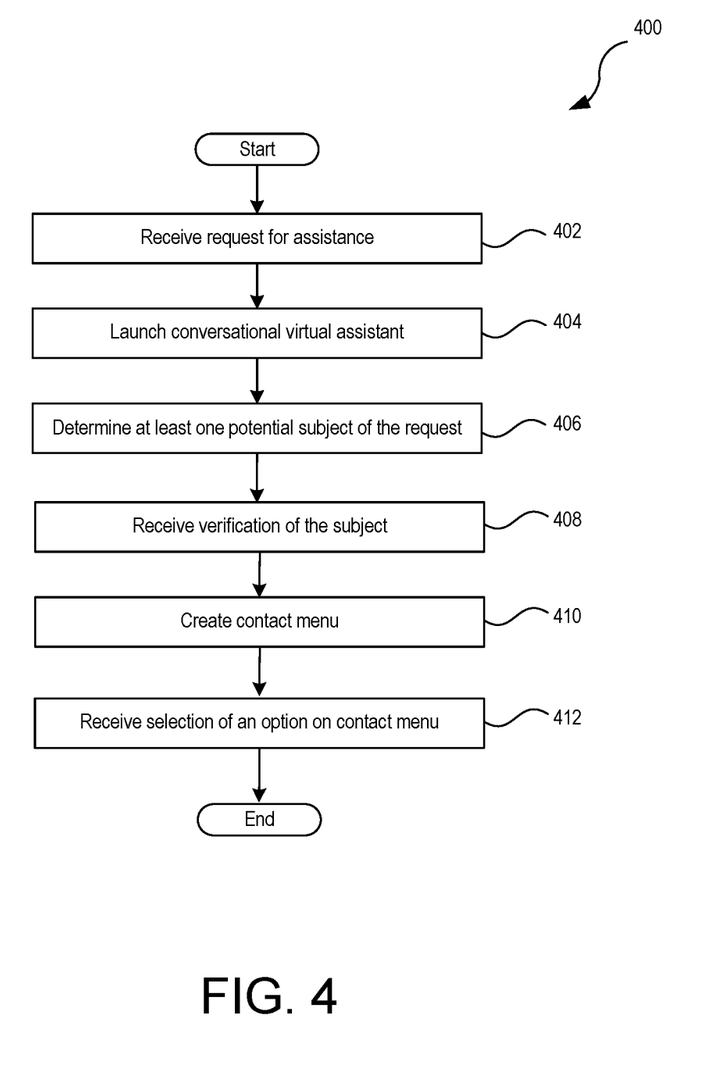
FIG. 4 is a flowchart illustrating a set of operations for providing assistance to a user via a virtual assistant platform in accordance with various embodiments of the present disclosure.

FIG. 4 is a flowchart illustrating sets of operations 400 for assisting a user using a conversational virtual assistant. In some embodiments, fewer than all of the operations in each set of operations are performed, whereas in other embodiments additional operations are performed. Moreover, in some embodiments, the operations may be performed in different orders or in parallel. The operations can be performed by components 200 of computing device 110 illustrated in FIG. 2, by third party 135, and/or by various components of virtual assistant platform 120 illustrated in FIG. 3.

Receiving operation 402 receives a request for assistance from a user. The user may be using a mobile application or a website and select "help" or "contact us" or something similar. In response to receiving the request for assistance, launching operation 404 launches a conversational virtual assistant on the user's device. The conversational virtual assistant can ask the user various questions to elicit user information about what help the user is seeking. The virtual assistant can also use recent website or mobile application search history, the webpage or tab the virtual assistant was launched from, and/or specific information regarding the user's profile (e.g., new products purchased, claims made by the user, bills owed by the user) to determine a likely subject of the user's inquisition.

Determining operation 406 determines at least one potential subject of the request and can present the options to the user (e.g., "Do you need more information or help with account X, claim Y, or bill Z?"). Receiving operation 408 receives a verification (e.g., verbal, tap, or typed selection) of the subject. Creating operation 410 creates a contact menu with options for the user to receive assistance regarding the subject. The options may include an option to speak with a targeted representative (i.e., a representative with knowledge of the subject), chat online with a targeted representative, video conference with a targeted representative, or continue conversing with the virtual assistant. The options may include additional information, such as estimated wait times for a targeted representative (e.g., "Call representative, estimated wait time of 3 minutes"), hours of operation (e.g., "the call center is closed now but will reopen at 6 am CDT"), and recommendations on which option to select (e.g., "this action will take approximately 2 minutes using the virtual assistant, approximately 5 minutes using a representative"). The system may poll the targeted representatives or review the number of callers ahead of the caller to determine the estimated wait time for a targeted representative. Receiving operation 412 receives a selection of one of the options on the contact menu, and the user is serviced accordingly.

Figure 5:
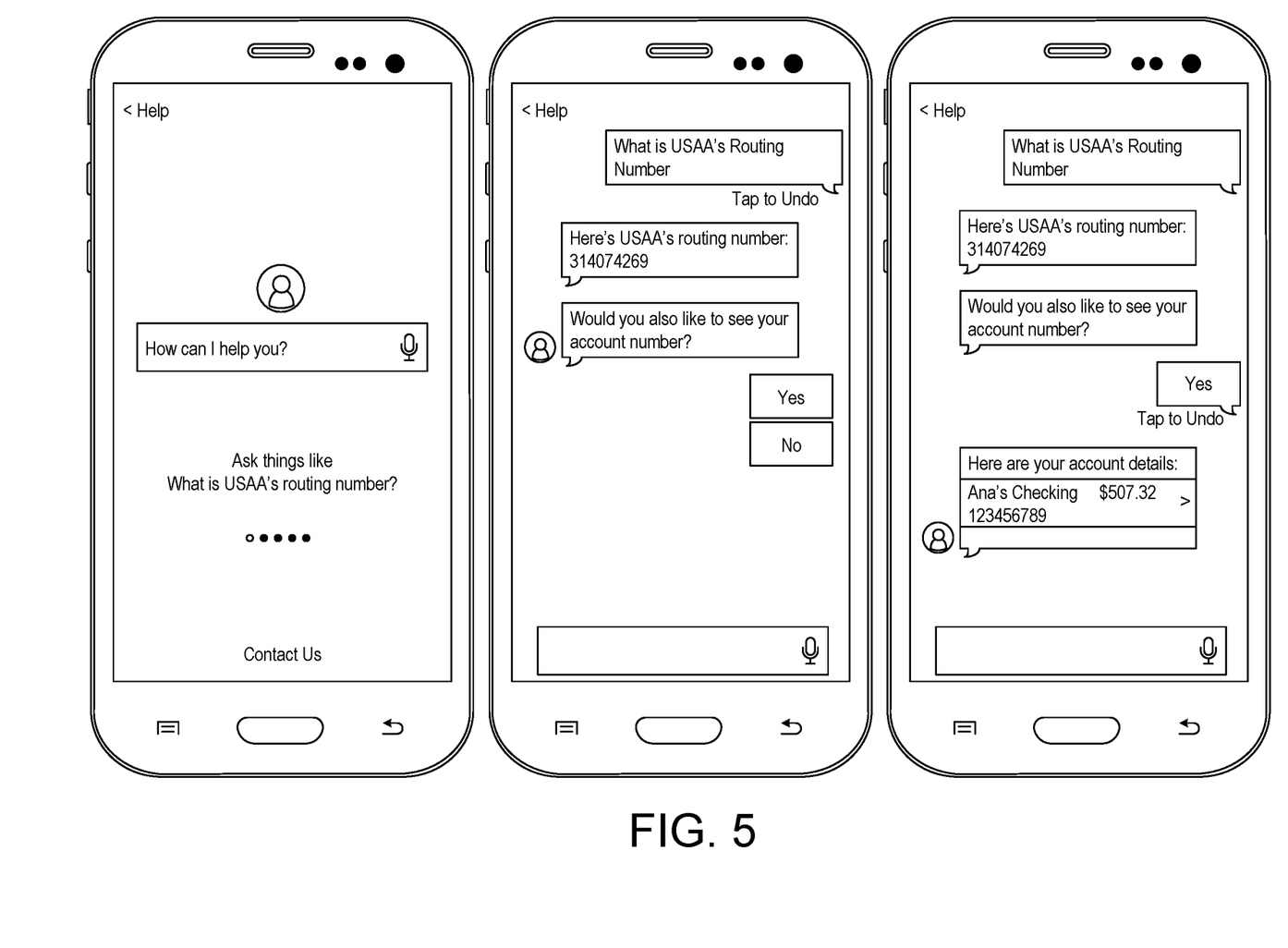
FIGS. 5-10 are examples of user interfaces that may be used in accordance with various embodiments of the present disclosure.

As shown in FIG. 5, the virtual assistant can simply state, "How can I help you?" and the user can type or verbally state a question (e.g., "What is USAA's Routing Number?"). The virtual assistant can then provide the routing number and further anticipate additional questions (e.g., "Would you also like to see your account number?"). The user can select "yes" or "no" by tapping one of the options.

Figure 6:
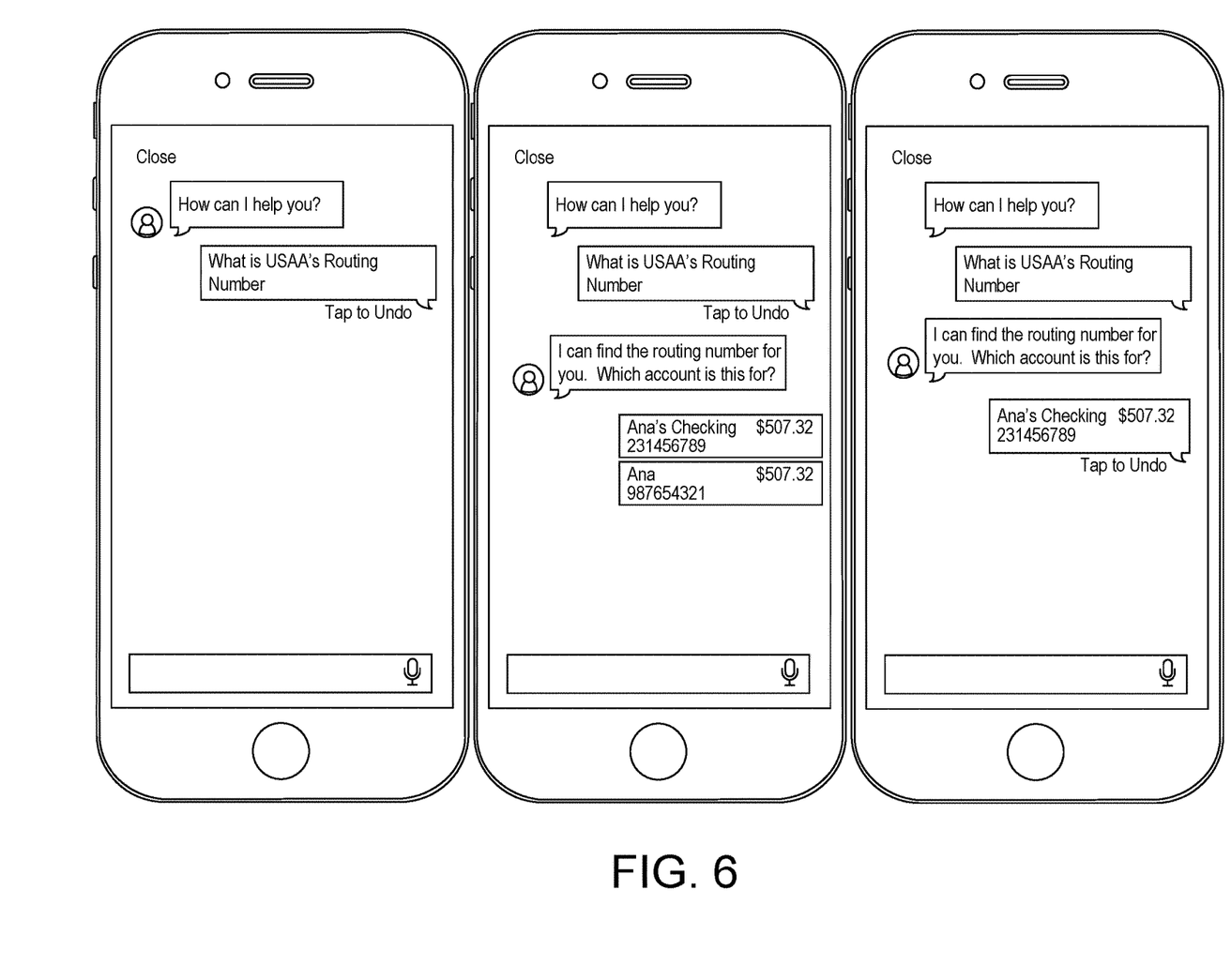
Figure 7:
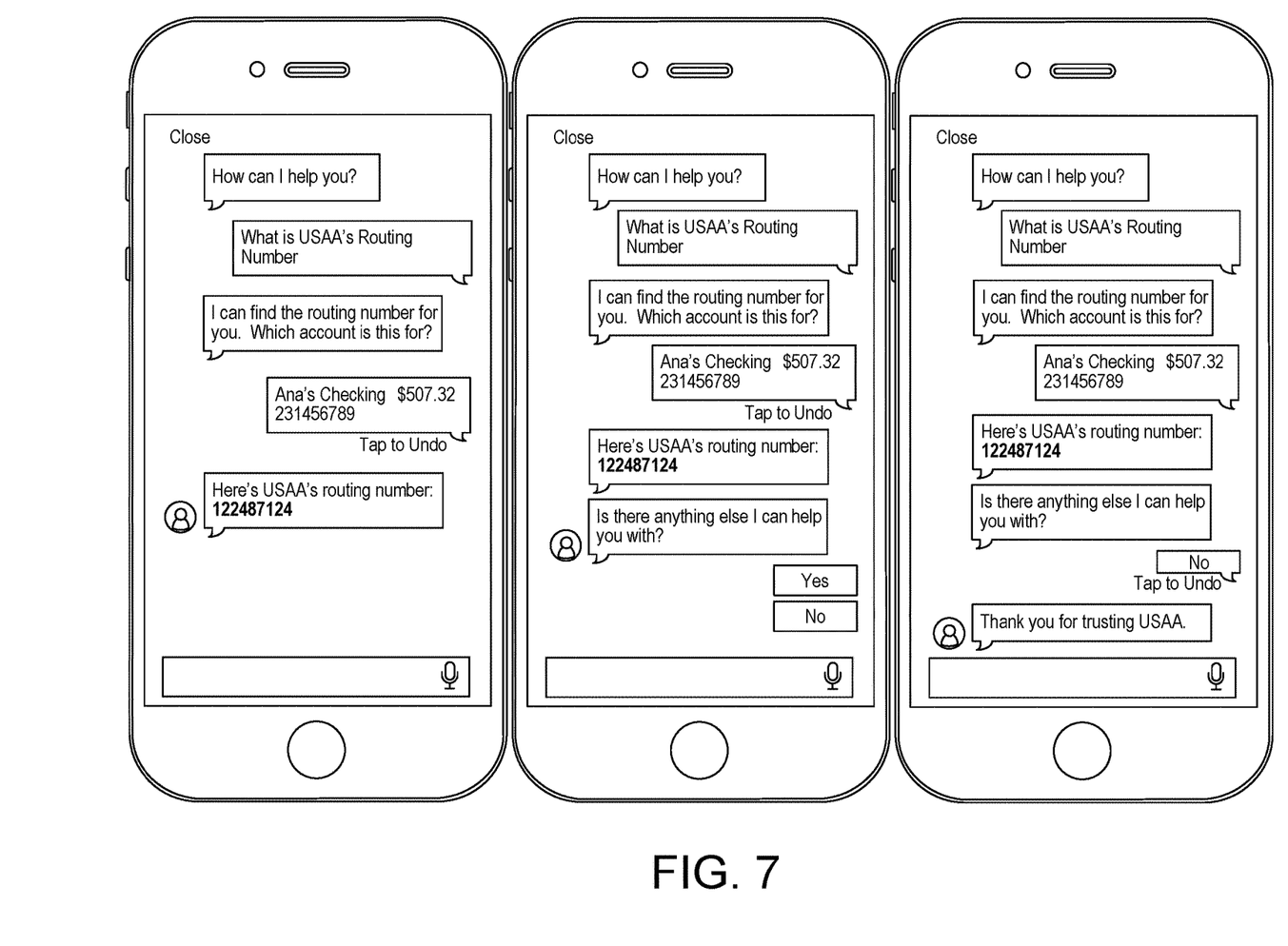

As shown in FIG. 6, the user asks for a routing number and the virtual assistant identifies that more than one account is associated with the user. Thus, the virtual assistant asks the user to choose which account the user needs the routing number from. The virtual assistant can provide a selectable list for the user. As shown in FIG. 7, when the user selects an account, the virtual assistant provides the routing number.

Figure 8:
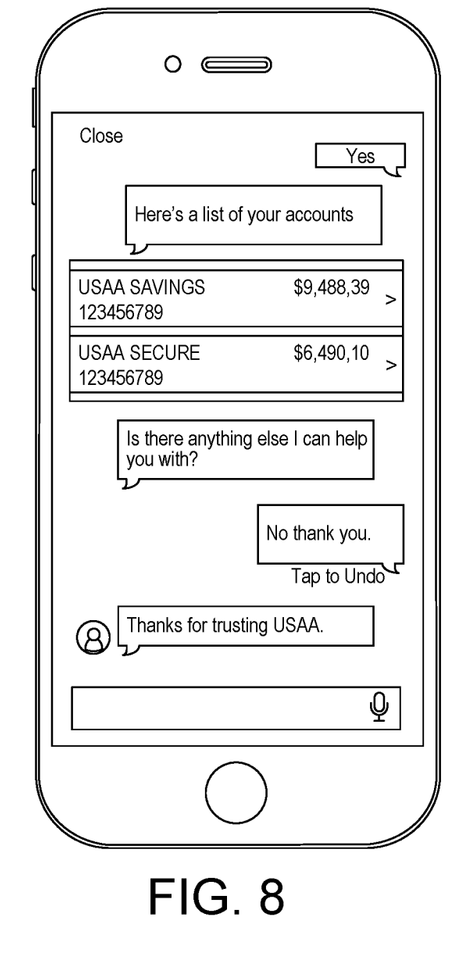

As shown in FIG. 8, the user is being provided with a list of the user's accounts and account balances. The user can select an account to view additional information.

Figure 9:
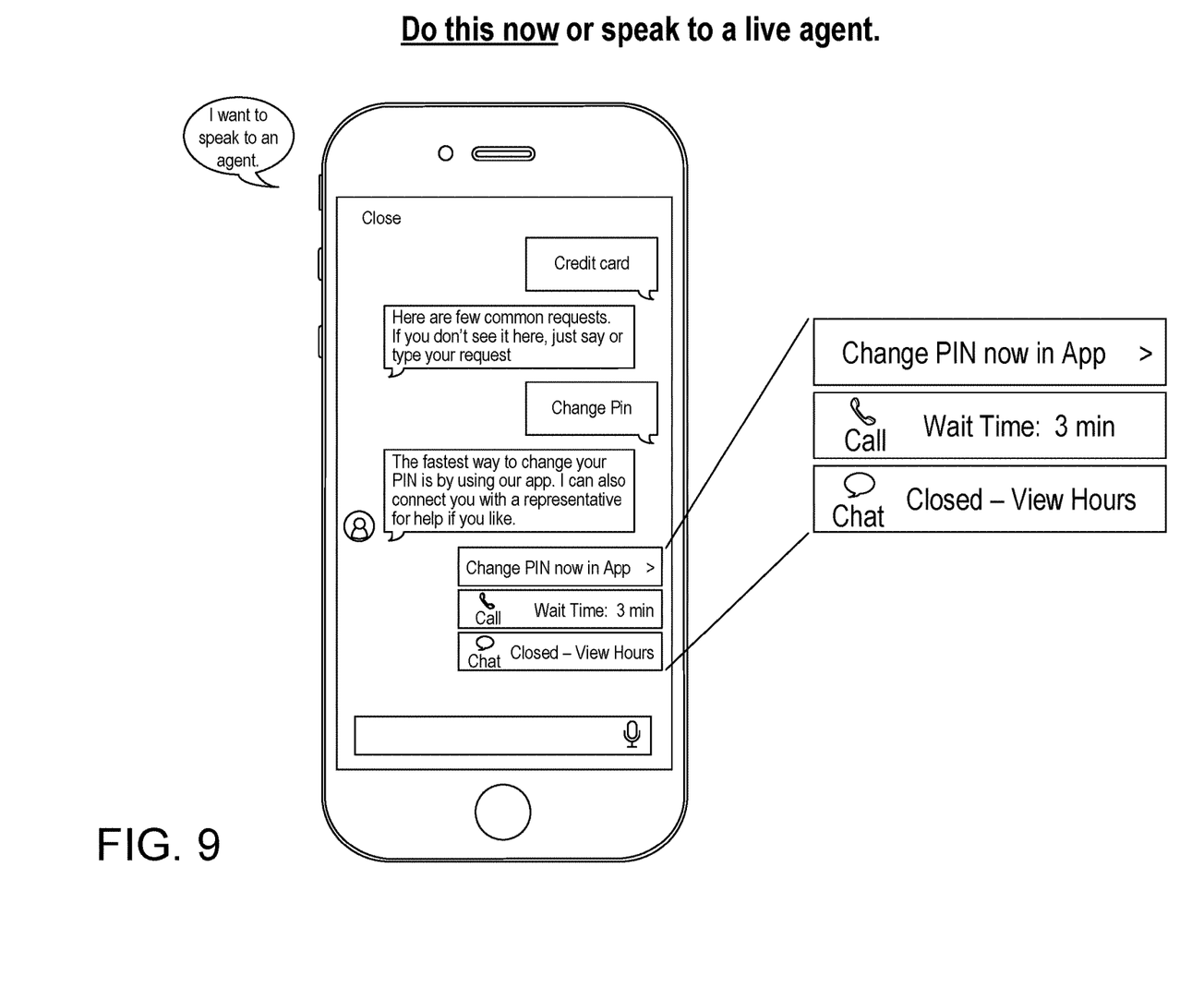

As shown in FIG. 9, the user is presented with a contact menu. The user is provided with options, including a self-help option if available (e.g., virtual assistant can help with the action or direct the user to a page or tab in the application (e.g., "Change PIN now in App)), an option to call a representative with a wait time, or an option to chat.

Figure 10:
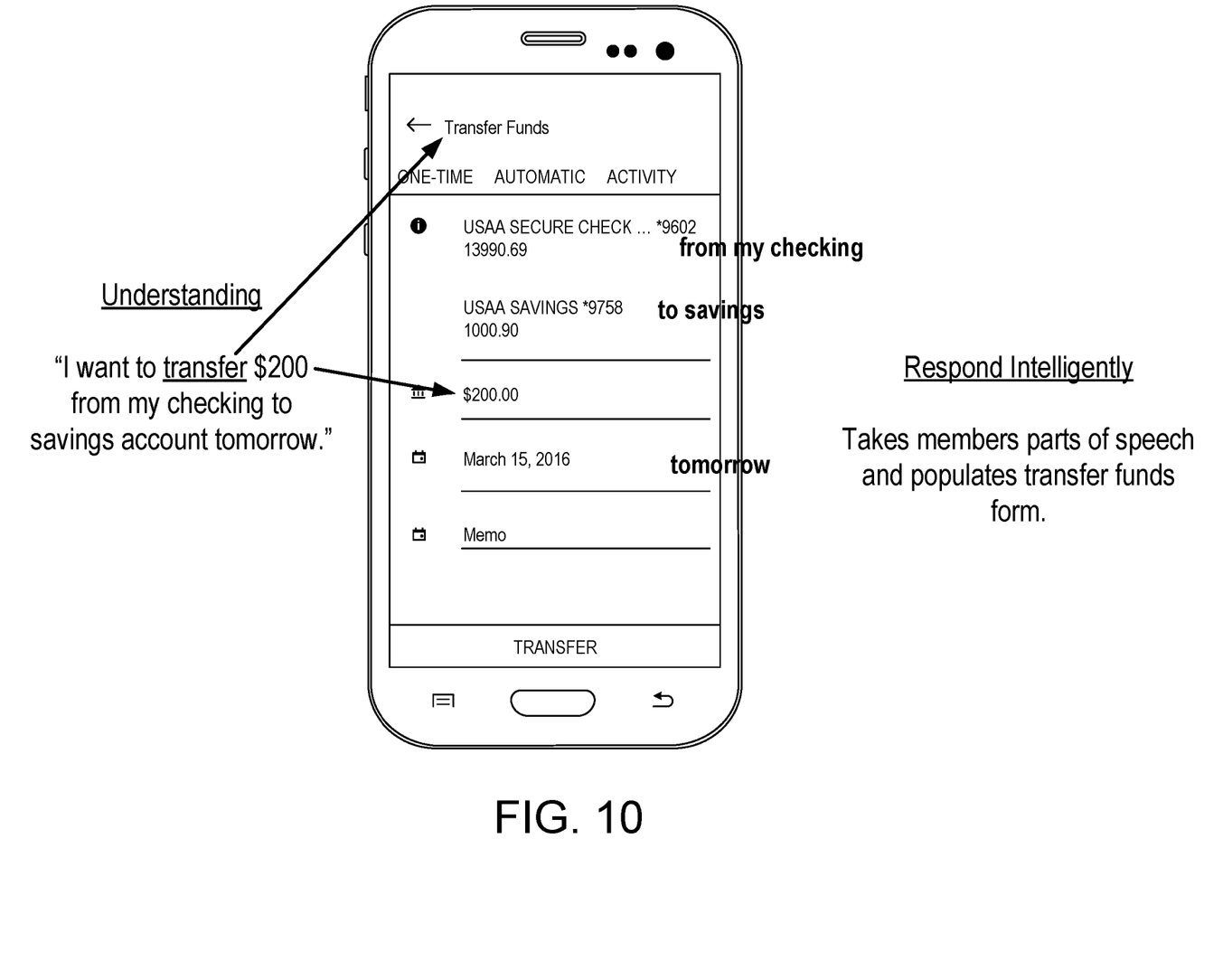

As shown in FIG. 10, the user can use the virtual assistant to fill out a form to complete an action for the user. Thus, just by speaking to the virtual assistant, the user can cause a command to be executed with no further human interaction from either the user or a representative.

Computer System Overview

Figure 11:
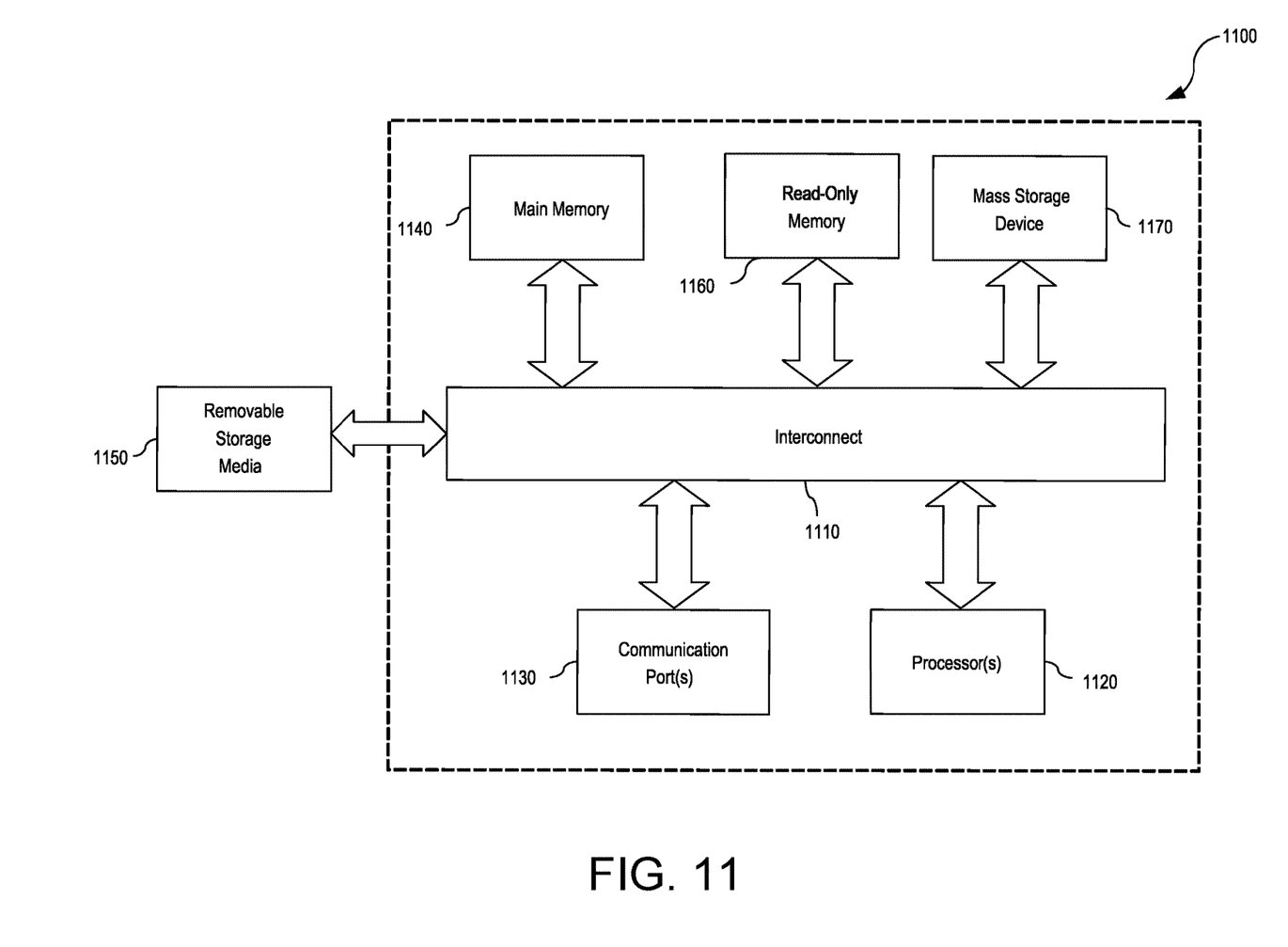
FIG. 11 illustrates an example of a computer system with which some embodiments of the present disclosure may be used.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 11 is an example of a computer system 1100 with which embodiments of the present disclosure may be utilized. According to the present example, the computer system 1100 includes an interconnect 1110, at least one processor 1120, at least one communication port 1130, a main memory 1140, a removable storage media 1150, a read-only memory 1160, and a mass storage device 1170.

Processor(s) 1120 can be any known processor, such as, but not limited to, an Intel® Itanium® or Itanium 2® processor(s), or AMD® Opteron® or Athlon MP® processor(s), or Motorola® lines of processors. Communication port(s) 1130 can be a RS-232 port for use with a modem-based dial-up connection, a 10/100 Ethernet port, or a Gigabit port using copper or fiber. Communication port(s) 1130 may be chosen depending on the type of network such as a Local Area Network (LAN), Wide Area Network (WAN), or any network to which the computer system 1100 connects.

Main memory 1140 can be random access memory (RAM) or any other dynamic storage device(s) commonly known in the art. Read-only memory 1160 can be any static storage device(s) such as programmable read-only memory (PROM) chips for storing static information, such as instructions for processor(s) 1120.

Mass storage device 1170 can be used to store information and instructions. Mass storage devices that may be used include hard disks such as the Adaptec® family of SCSI (small computer system interface) drives, optical discs, an array of discs such as RAID (redundant array of independent disks), the Adaptec® family of RAID drives, or any other mass storage device.

Interconnect 1110 communicatively couples processor(s) 1120 with the other memory, storage, and communication blocks. Depending on the storage devices used, interconnect 1110 can be a PCI/PCI-X- or SCSI-based system bus.

Removable storage media 1150 can be any type of external hard drive, floppy drive, IOMEGA® Zip Drives, compact disc read-only memory (CD-ROM), compact disc rewritable (CD-RW), and/or digital video disc read-only memory (DVD-ROM).

The components described above are meant to exemplify some types of possibilities. In no way should the aforementioned examples limit the disclosure, as they are only exemplary embodiments.

TERMINOLOGY

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which a connection or a coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" encompasses being completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules; or a module can include one or more application programs.

The term "network" generally refers to a group of interconnected devices capable of exchanging information. A network may be as small as several personal computers on a local area network (LAN) or as large as the Internet, a worldwide network of computers. As used herein, "network" is intended to encompass any network capable of transmitting information from one entity to another. In some cases, a network may comprise multiple networks—even multiple heterogeneous networks—such as one or more border networks, voice networks, broadband networks, financial networks, service provider networks, Internet service provider (ISP) networks, and/or public switched telephone networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. More importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead, are meant to be examples. Other systems, devices, and networks to which embodiments of the present disclosure are applicable include, but are not limited to, other types of communication and computer devices and systems. More specifically, embodiments are applicable to communication systems, services, and devices, such as cell phone networks and compatible devices. In addition, embodiments are applicable to all levels of computing, from the personal computer to large network mainframes and servers.

In conclusion, the present disclosure discloses novel systems, methods, and arrangements for assisting a caller using a conversational virtual assistant. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments that have different combinations of features and embodiments that do not include all of the described features. Accordingly, the scope of the present disclosure is intended to embrace all such alternatives, modifications, and variations that fall within the scope of the claims, together with all equivalents thereof. Therefore, the above description should not be taken as limiting.

What is claimed is:

1. A method of routing a call, the method comprising:
receiving, via a network, a request for assistance from a device associated with a user;
causing at least one potential subject of the request to be displayed on the device associated with the user;
receiving a verbal verification that the user selected the at least one potential subject of the request;
in response to receiving the verbal verification, creating a menu with options including:
during hours in which a call representative is available, assistance via a call representative for the at least one potential subject of the request, and
during hours in which a call representative is not available, assistance stating operating hours in which a call representative is available;
causing the menu to be displayed on the device; and
receiving an indication of a selection by the user of one of the options.

2. The method of claim 1, further comprising:
receiving a second indication to undo the selection of one of the options;
in response to the indication to undo the selection, removing a graphical indication of the selection from a display of the device; and
receiving a third indication of a second selection of a different option.

3. The method of claim 1, further comprising:
determining a recommendation of an option of the menu based on the at least one potential subject of the request; and
providing the recommendation via the device.

4. The method of claim 1,
wherein the option for the assistance via the call representative includes options to speak with a targeted representative who was selected based on the targeted representative having a designation as knowledgeable in the at least one potential subject; and
wherein the options to speak with the targeted representative include one or more of:
an option to chat online with the targeted representative;
an option to have a video conference with the targeted representative; or
an option to have a phone conversation with the targeted representative.

5. The method of claim 1, wherein the verbal selection is one of:
a command to replace or cancel a stolen or lost payment instrument;
a command to activate a new payment instrument;
a command to transfer funds;
a command to pay a bill;
a command to order checks;
a command to increase a withdrawal limit; or
a command to view an insurance policy.

6. The method of claim 1, wherein the potential subject of the request is further based on information associated with the user including indicia of products or services A) purchased by the user or B) determined as candidate products or services to be purchased by the user.

7. The method of claim 1, wherein the menu further includes a first wait time for receiving assistance via the call representative and a second wait time for receiving assistance via a conversational virtual assistant.

8. The method of claim 1, wherein the options further include a text area into which user requests are provided.

9. The method of claim 1, wherein the options further include an option to see an account number of the user.

10. The method of claim 1, wherein the options further include an option to select one of multiple accounts, of the user, for which a response to the potential subject of the request is to be customized.

11. The method of claim 1, wherein the options further include an option to transfer funds between multiple accounts of the user.

12. A non-transitory computer-readable storage medium storing instructions that, when executed by a computing system, cause the computing system to perform a process for routing a call, the process comprising:
receiving, via a network, a request for assistance from a device associated with a user;
causing at least one potential subject of the request to be displayed on the device associated with the user;
receiving a verbal verification that the user selected the at least one potential subject of the request;
in response to receiving the verbal verification, creating a menu with options including:
during hours in which a call representative is available, assistance via a call representative for the at least one potential subject of the request, and
during hours in which a call representative is not available, assistance stating operating hours in which a call representative is available;
causing the menu to be displayed on the device; and
receiving an indication of a selection by the user of one of the options.

13. The non-transitory computer-readable storage medium of claim 12, wherein the process further comprises:
receiving a second indication to undo the selection of one of the options;
in response to the indication to undo the selection, removing a graphical indication of the selection from a display of the device; and
receiving a third indication of a second selection of a different option.

14. The non-transitory computer-readable storage medium of claim 12, wherein the process further comprises:
determining a recommendation of an option of the menu based on the at least one potential subject of the request; and
providing the recommendation via the device.

15. The non-transitory computer-readable storage medium of claim 12,
wherein the option for the assistance via the call representative includes options to speak with a targeted representative who was selected based on the targeted representative having a designation as knowledgeable in the at least one potential subject; and
wherein the options to speak with the targeted representative include one or more of:
an option to chat online with the targeted representative;
an option to have a video conference with the targeted representative; or
an option to have a phone conversation with the targeted representative.

16. The non-transitory computer-readable storage medium of claim 12, wherein the verbal selection is one of:
a command to replace or cancel a stolen or lost payment instrument;
a command to activate a new payment instrument;

a command to transfer funds;
a command to pay a bill;
a command to order checks;
a command to increase a withdrawal limit; or
a command to view an insurance policy.

17. The non-transitory computer-readable storage medium of claim 12, wherein the potential subject of the request is further based on information associated with the user including indicia of products or services purchased by the user.

18. A computing system for routing a call, the computing system comprising:
- one or more processors; and
- one or more memories storing instructions that, when executed by the one or more processors, cause the computing system to perform a process comprising:
  - receiving, via a network, a request for assistance from a device associated with a user;
  - causing at least one potential subject of the request to be displayed on the device associated with the user;
  - receiving a verbal verification that the user selected the at least one potential subject of the request;
  - in response to receiving the verbal verification, creating a menu with options including:
    - during hours in which a call representative is available, assistance via a call representative for the at least one potential subject of the request, and
    - during hours in which a call representative is not available, assistance stating operating hours in which a call representative is available;
  - causing the menu to be displayed on the device; and
  - receiving an indication of a selection by the user of one of the options.

19. The computing system of claim 18,
wherein the option for the assistance via the call representative includes options to speak with a targeted representative who was selected based on the targeted representative having a designation as knowledgeable in the at least one potential subject; and
wherein the options to speak with the targeted representative include one or more of:
- an option to chat online with the targeted representative;
- an option to have a video conference with the targeted representative; or
- an option to have a phone conversation with the targeted representative.

20. The computing system of claim 18, wherein the menu further includes a first wait time for receiving assistance via the call representative and a second wait time for receiving assistance via a conversational virtual assistant.

* * * * *